(12) United States Patent
Notari et al.

(10) Patent No.: US 9,781,008 B1
(45) Date of Patent: Oct. 3, 2017

(54) VISUALIZATION OF DYNAMIC FABRIC AUTOMATION NETWORK TOPOLOGY

(71) Applicant: Cisco Technology, Inc., San Jose, CA (US)

(72) Inventors: Jason David Notari, Pleasanton, CA (US); Sachin Vijay Vishwarupe, Santa Clara, CA (US); Kora Bongen, Batavia, IL (US); Hanuma Kumar Chilakamarthi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 14/250,490

(22) Filed: Apr. 11, 2014

(51) Int. Cl.
*H04L 12/28* (2006.01)
*H04L 12/24* (2006.01)

(52) U.S. Cl.
CPC .................... *H04L 41/12* (2013.01)

(58) Field of Classification Search
CPC ........ H04W 48/10; H04W 4/008; H04L 41/12
USPC ......................................................... 370/254
See application file for complete search history.

(56) References Cited

U.S. PATENT DOCUMENTS

| | | | |
|---|---|---|---|
| 6,628,304 B2 | 9/2003 | Mitchell et al. | |
| 6,687,750 B1 | 2/2004 | Messinger et al. | |
| 7,307,256 B1* | 12/2007 | Reber .................. | G01V 5/0069 250/339.07 |
| 7,539,972 B2 | 5/2009 | Wang et al. | |
| 7,849,408 B1 | 12/2010 | Messinger et al. | |
| 7,885,204 B1 | 2/2011 | Schongar et al. | |
| 7,983,174 B1 | 7/2011 | Monaghan et al. | |
| 8,185,824 B1 | 5/2012 | Mitchell et al. | |
| 2003/0196136 A1* | 10/2003 | Haynes ............... | G06F 11/0715 714/13 |
| 2005/0232407 A1* | 10/2005 | Craig .................... | H04L 45/02 379/229 |
| 2008/0104057 A1* | 5/2008 | Billmaier .......... | G06F 17/30696 |
| 2013/0229910 A1* | 9/2013 | McKnight, Jr. ....... | H04W 24/04 370/218 |
| 2013/0289364 A1* | 10/2013 | Colman ................ | A61M 16/04 600/301 |
| 2013/0336235 A1* | 12/2013 | Meyer ................... | H04W 72/04 370/329 |
| 2014/0003417 A1* | 1/2014 | Shauh ................. | H04W 56/001 370/350 |
| 2014/0122751 A1* | 5/2014 | Myrah ............... | G06F 11/0727 710/16 |
| 2014/0123074 A1* | 5/2014 | Estrem ............. | H04M 1/72519 715/853 |
| 2014/0187173 A1* | 7/2014 | Partee ................... | H04B 17/00 455/67.12 |

(Continued)

*Primary Examiner* — Faisal Choudhury
(74) *Attorney, Agent, or Firm* — Edell, Shapiro & Finnan, LLC

(57) ABSTRACT

In one example embodiment, a computer-implemented method is provided in which data is received that represents connectivity state between a plurality of nodes interconnected in a hierarchical manner in a network and including a first tier of nodes and a second tier of nodes, wherein the nodes in the second tier have at least one link to each node in the first tier. Display data is generated based on the connectivity state among the plurality of nodes, the display data describing a graphical user representation of the inter-tier link status of individual nodes or groupings of nodes. The display data is presented to a display device.

24 Claims, 13 Drawing Sheets

(56) References Cited

U.S. PATENT DOCUMENTS

| | | | |
|---|---|---|---|
| 2014/0254638 A1* | 9/2014 | Maeda | H04B 3/36 375/211 |
| 2014/0277582 A1* | 9/2014 | Leuthardt | A61F 2/54 623/25 |
| 2015/0160811 A1* | 6/2015 | Shah | G06F 3/0482 715/855 |

* cited by examiner

1200

```
┌─────────────────────────────────────────────────────────────────┐
│ RECEIVE DATA REPRESENTING CONNECTIVITY STATE BETWEEN A PLURALITY│──1210
│ OF NODES INTERCONNECTED IN A HIERARCHICAL MANNER IN A NETWORK AND│
│ INCLUDING AT LEAST A FIRST TIER OF NODES AND A SECOND TIER OF NODES,│
│ WHEREIN THE NODES IN THE SECOND TIER HAVE AT LEAST ONE LINK TO EACH│
│                   NODE IN THE FIRST TIER                        │
└─────────────────────────────────────────────────────────────────┘
                                │
                                ▼
┌─────────────────────────────────────────────────────────────────┐
│ GENERATE DISPLAY DATA BASED ON THE CONNECTIVITY STATE AMONG THE │──1220
│  PLURALITY OF NODES, THE DISPLAY DATA DESCRIBING A GRAPHICAL USER│
│ REPRESENTATION OF THE INTER-TIER LINK STATUS OF INDIVIDUAL NODES OR│
│                       GROUPINGS OF NODES                        │
└─────────────────────────────────────────────────────────────────┘
                                │
                                ▼
              ┌──────────────────────────────────────┐
              │ PRESENT THE DISPLAY DATA TO A DISPLAY DEVICE │──1230
              └──────────────────────────────────────┘
```

FIG.12

VISUALIZATION OF DYNAMIC FABRIC AUTOMATION NETWORK TOPOLOGY

TECHNICAL FIELD

The present disclosure relates to field of networking, and specifically to the field of network management systems for displaying large-scale network management data.

BACKGROUND

Computer networks are growing at a rapid pace. As computer networks expand, scalability has emerged both as a critical requirement as well as a fundamental challenge. Network administrators and analysts need insight into the devices that exist in the network in order to configure, maintain and troubleshoot the network. Additionally, users expect real-time data so they can respond immediately to new information. In order to act on this new information, the network administrator needs to understand it.

In a large-scale network, the number of nodes and the immense number of links, resulting from near mesh connectivity, creates chaos in traditional visualization methods. This chaos inhibits legibility and comprehension of any problems that may arise in the network.

BRIEF DESCRIPTION OF THE DRAWINGS

FIG. 12 is a flow chart generally depicting operations performed for the display techniques according to the example embodiments presented herein.

DESCRIPTION OF EXAMPLE EMBODIMENTS

Overview

In one example embodiment, a computer-implemented method is provided in which data is received that represents connectivity state between a plurality of nodes interconnected in a hierarchical manner in a network and including a first tier of nodes and a second tier of nodes, wherein the nodes in the second tier have at least one link to each node in the first tier. Display data is generated based on the connectivity state among the plurality of nodes, the display data describing a graphical user representation of the inter-tier link status of individual nodes or groupings of nodes. The display data is presented to a display device.

EXAMPLE EMBODIMENTS

Dynamic Fabric Automation (DFA) is a networking feature that helps enable network automation and provisioning, to simplify both physical servers and virtual machine deployments and movements across the network fabric. DFA uses network administration-defined profile templates for physical and virtual machines.

The size of the networks that a network administrator is responsible for managing can be substantial. For example, a network may have 400 devices, including 2 tiers with 16 spines, and 384 leaves, or 6144 links connected in a two-tier folded Clos network topology (also known as a complete bipartite graph). The complexity is expected to increase with up to 1000 devices in N tiers (where 2<N<16) in a multi-tier folded nested Clos network topology (a k-partite graph of nested complete bipartite sub-graphs).

Conventional ways of displaying a network of this size and shape result in a solid ball of edges. Even at a smaller scale, near-mesh connectivity becomes illegible due to the large number of overlapping links. Attempts to draw link information result in visual information overload.

Network administrators and analysts use network topology visualizations to show what devices and connections are in the network and the status of those devices and connections. Traditional layouts fail at this scale, where the sheer number of nodes and edges results in illegible chaos.

According to the example embodiments presented herein, a visualization tool is provided that exploits some of the strict requirements of the DFA Networks, where each tier is fully connected to all switches in the partition of the tier below. The presentation is simplified to hide all edges (links) and present inter-tier link status on the individual nodes or node groupings. Detailed connections are only shown when needed or requested by a user. This allows the display to be greatly simplified and to distill the essence of the network status into the presentation for human consumption. Detailed device and link status is explicitly shown on selection and hover. This allows the user to instantly recognize the connection state of a large fabric, as well as drill-down to obtain additional detailed information.

Figure 1:
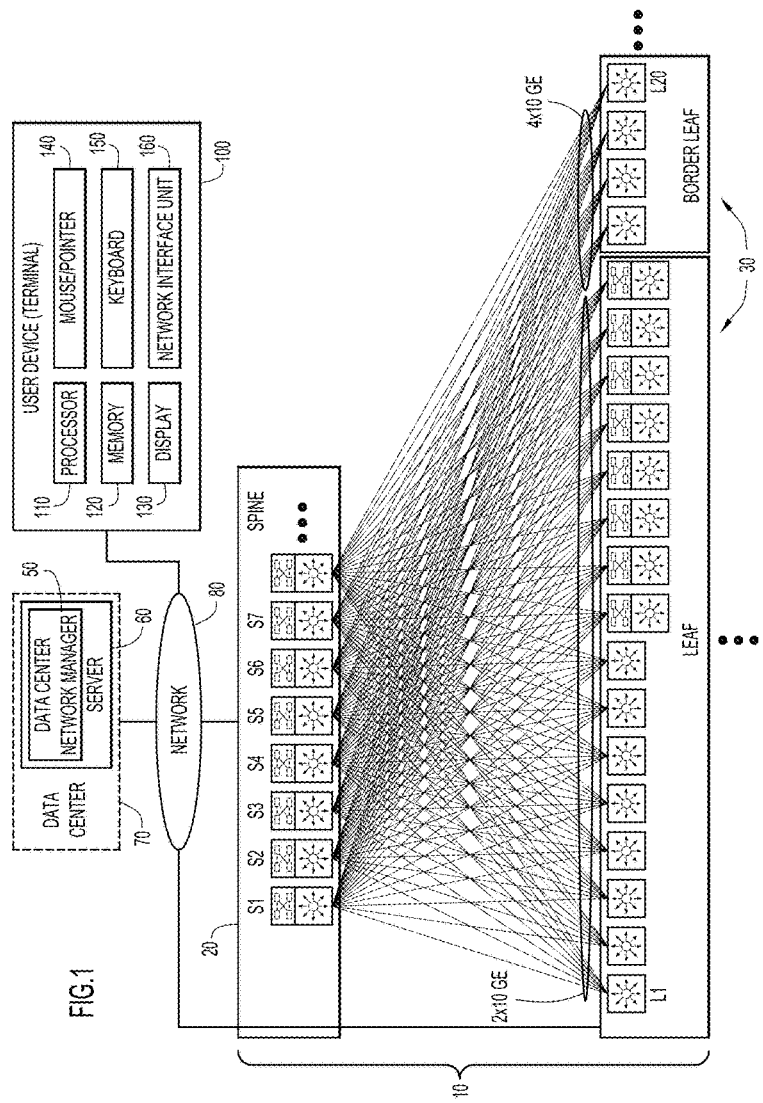
FIG. 1 is a block diagram illustrating an example of a network and a data center network manager configured to generate display data to visualize the state of nodes in the network, according to an example embodiment.

Reference is first made to FIG. 1, which shows an example network topology for which the visualization techniques according to the embodiments presented herein may be used. The network topology is shown generally at reference numeral 10 and includes a plurality of nodes interconnected in a hierarchical manner, and including at least a first tier 20 of nodes and a second tier 30 of nodes. The nodes in the second tier 30 may have at least one link to each node in the first tier 20. The first tier 20 is referred to as a "spine tier" and individual nodes in the "spine tier" are referred to as spines. The second tier 30 is referred to as a "leaf tier" and individual nodes in the "leaf tier" are referred to as leaves. Each leaf node may have at least one connection to every spine node. Each node in the first tier 20 and the second tier 30 may be a network element, such as a switch, a router or other entity having or controlling network connectivity or computing capabilities. In the example of FIG. 1, there are eight nodes S1-S8 in the first tier 20 and twenty nodes L1-L20 in the second tier, but this is only an example and there may be more or less nodes in the first tier 20 and in the second tier 30.

A data center network manager 50 running on a server 60 in a data center 70 manages the nodes in the network 10. To this end, the data center network manager 50 receives data representing connectivity state among the nodes in the first tier 20 and second tier 30. There are many techniques and tools known in the art by which the connectivity state information can be obtained and directed to the network manager 50. Those tools are outside the scope of this disclosure. This connectivity state information may be obtained via network 80 directly from the nodes themselves or from a third party application or entity that monitors and collects data pertaining to the connectivity state among the nodes. As will become more apparent hereinafter, the network manager 50 generates display data configured to visualize problem areas in the network 10 and the scale of any problems at a glance.

FIG. 1 also shows a user device 100 that has connectivity, to the network 80, via the network manager 50. The user device 100 may be any computing device with network connectivity or a remote terminal with limited computing capabilities but running a browser application that can connect to the network manager 50 to receive and display data generated by the network manager 50. The user device 100 may include a processor 110, a memory 120, a display 130, a mouse/pointer 140, keyboard 150 (or touchscreen keyboard), and a network interface unit 160. The user device 110 enables a network administrator, from any location, to log into the network manager 50 to request a visualization of network 10. As an alternative, the user device 100 may be connected locally and directly to the server 60.

Figure 2:
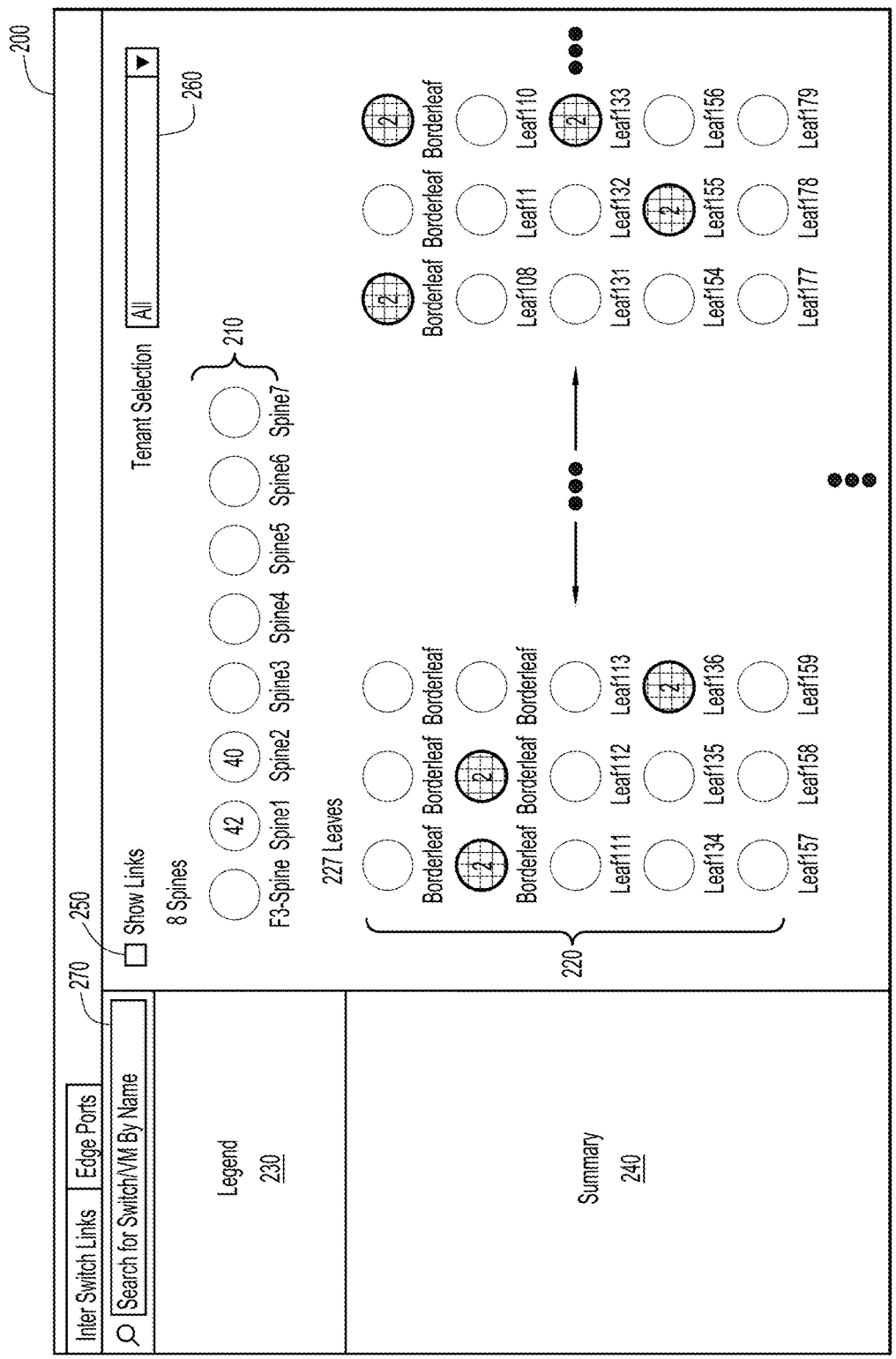
FIG. 2 illustrates an example of a display screen in a base visualization mode for presenting the state of nodes in the network, according to an example embodiment.

Reference is now made to FIG. 2 for an example of a general basis display mode that the network manager 50 can generate according to the techniques presented herein. The network manager 50 generates display data on a screen/page 200 based on the connectivity state of the plurality of nodes, where the display data describes a graphical user representation of the inter-tier link status of individual nodes or groupings of nodes. Using the highly structured hierarchy of the topology of network 10, each node partition can be represented by a block of nodes in rows. In a two-tier case such as that shown in FIG. 1, there are two blocks 210 and 220, separated by whitespace and labels, of graphical elements generated by the network manager 50. Each graphical element represents a node, and may take the form of a circle, oval or ellipse. Thus, block 210 includes graphical elements, each representing a node in tier 20 and block 220 includes graphical elements, each representing a node in tier 30. These blocks use the small multiples visualization technique. In the field of visualization, the term "small multiples" refers to a grid or series of small similar graphics or charts used for making comparisons.

As indicated in FIG. 2, there are 8 nodes in the "spine" tier for block 210 and 227 nodes in the "leaf" tier for block 220. The number of nodes is only an example. Moreover, to simplify the drawings, many graphical elements for block 220 are not shown, but it is to be understood that there would be a graphical element generated for display of every node in a tier. If there are too many nodes to be displayed on one display screen, then an icon may be displayed to allow the user to move to left, right, up or down in order to view additional nodes. In addition, the nodes themselves may be sized to fit in the screen with a certain minimum and maximum size. For example, based on available display space on a display screen, the size of the graphical elements for each of the nodes may be adjusted and it may be determined whether or not to display labels associated with the graphical elements.

Each node is given a label that is displayed beneath the node, for example. This is a label for visualization that may be the network name to identify the node, though it is not necessarily the network name associated with that node. In the base display mode, all edges (links between nodes) are hidden unless requested to be displayed by a user. This is the base display mode shown in FIG. 2.

The screen 200 further includes a legend region 230, a summary region 240, a "show links" selection check-box 250, a tenant selection drop-down menu 260 and a search box 270. The legend region 230 is described hereinafter in connection with FIG. 3. The summary region 240 is a place where additional information can be displayed, e.g., in a list format, for a particular node or a set of nodes, as will be described in further detail hereinafter.

The "show" links selection check-box 250 allows a user to force the display of links for the nodes being displayed.

The tenant selection drop-down menu 260 allows a user to visualize the nodes that are handling traffic associated with only certain "tenants", i.e., customers. This allows a user to reduce the number of nodes being displayed. A user would select a particular part of the network based on the particular tenant partition (one of the items in the drop-down menu 260), to show only the nodes used for traffic for a certain tenant. This can reduce the amount of nodes down to perhaps only a few leaf nodes, and all others would be displayed in a less conspicuous manner, e.g., "greyed-out" or, if desired, not displayed at all.

The search box 270 allows a user to enter a name or IP address of a physical or virtual machine (e.g., "webapp1," "webapp2," etc.) in order to display only those nodes to which that particular physical or virtual machine is connected. All other nodes may be displayed in a less conspicuous manner, e.g., "greyed-out," to therefore simplify the amount of data displayed.

Figure 3:
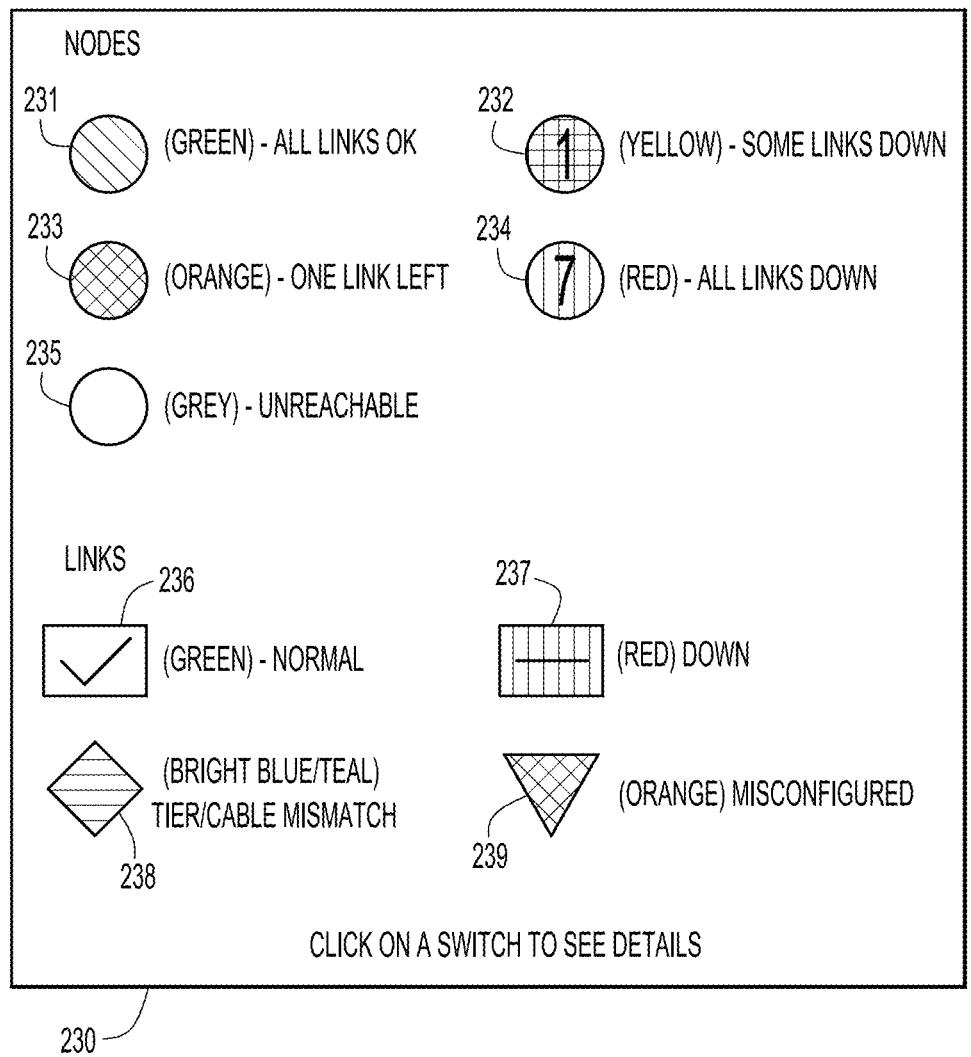
FIG. 3 illustrates an example of a legend for the display screen, according to an example embodiment.

Circles may be used as the graphical element type to represent nodes due to the visual simplicity of circles. A color and/or pattern coding scheme may be used to represent state of links associated with a node. Reference is now made to FIG. 3, with continued reference to FIG. 2. FIG. 3 illustrates an example of legend 230 used for graphically representing the status of nodes and links in a network. As an example, green may be used to denote "All Links Up/OK" for a node as shown at 231, yellow may be used to indicate "Some Links Down" as shown at 232, orange may be used to indicate "One Link Left/Up" at 233, and red may be used to indicate "All Links Down" at 234. A grey or some other less conspicuous color or pattern, as shown at 235, may be used to denote that the node is unreachable.

In addition, there are icons to illustrate the state of a link. At 236, a green-colored link (with a check mark) may be used to indicate that the link is up and operating normally. At 237, a red-colored link (with a horizontal line) may be used to indicate that the link is down (error state). Also, a bright blue/teal colored diamond icon 238 may be used to represent a link that is mismatched to the wrong tier. An orange-colored inverted triangle icon 239 may be used to denote a link that is misconfigured.

Due to the inability to show color in the drawings, cross-hatching is used to represent these colors. However, it should be understood that a cross-hatching or other visual pattern may be used to represent the different states. Moreover, color in addition to a visual pattern may be used. For example, a blinking scheme may be used to conspicuously indicate nodes that have no links operating in a non-error state.

The colors may be chosen with different saturations to make it easier for colorblind users to differentiate states. Certain green colors have relatively low saturation in order to be less distracting and allow the error colors to attract more attention. This may be done to both make the visualization easier on the eyes at scale and allow the user to focus on problem areas.

In addition to color, numbers are displayed within or in some other spatial relationship (above, below or on the side) with respect to the circles to depict the number of links affected. This reinforces the color-coding and gives the viewer more information about the problem. More specifically, for nodes that have "some links down", a number is displayed within the circle. The number indicates how many links are down for that node. For example, in FIG. 2, node "Spine1" has 42 links down and node "Spine 2" has 40 links down. Similarly, there are several different leaf nodes that have 2 links that are down. For a node that has all links down, a number indicating how many links are associated with that node, may also be displayed within the circle for that node, as shown at 234 the example in the legend 230. The data representing node status is automatically changed in response to receiving asynchronous status change notifications associated with the nodes, e.g., traps or Syslog alerts configured by the data center network manager 50, for example.

In general, the numbers displayed within the circles for leaf nodes are equal to or less than the number of spine nodes. It is possible that the number can be greater when there is channel sharing involved between leaf nodes or when there are multiple links between a spine node and a given leaf node, according to how much bandwidth is needed in the network. Moreover, in general, a number may be displayed in association with a graphical element (node) when a particular color or pattern is set for the graphical element (e.g., orange or red) such that the number indicates a state associated with a node that satisfies a threshold such as, number of links down (of any particular type), percentage of central processor unit (CPU) utilization, temperature, etc. The number corresponds to a particular color-coding and appears when a state or condition satisfies a threshold and may need network administrator attention.

Figure 4:
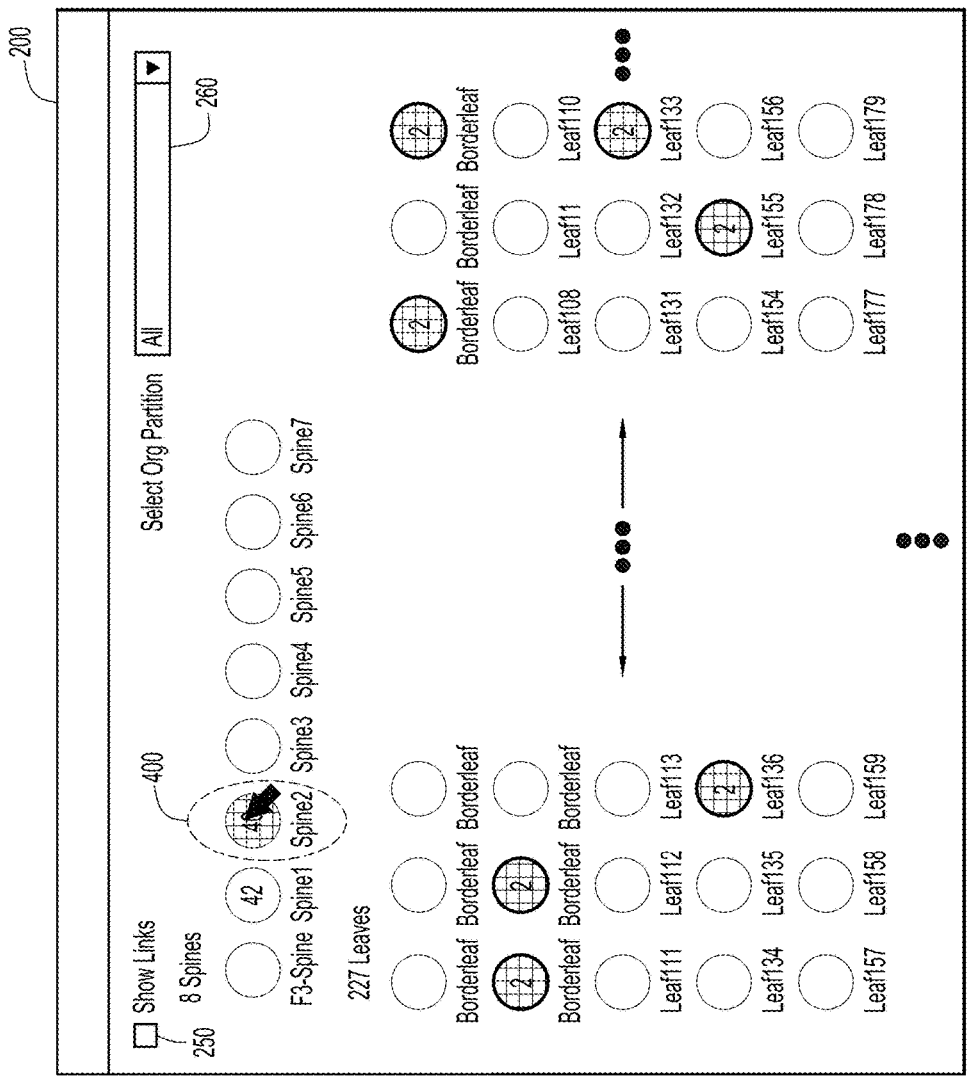
FIG. 4 illustrates an example of the display screen when a hover over a first node occurs, according to an example embodiment.

Reference is now made to FIG. 4. FIG. 4 shows visualization changes that occur when a mouse is hovered over a node. For example, as shown at 400, a mouse or other pointer is hovering over node Spine 2. Hovering over a node will trigger color-coded rings around all nodes with which a link to the hover node is in any type of error state. A blue ring or highlight around a node may be used to flag nodes (having a link to the hover node) that have some links with error states, while a red ring or highlight around a node may be used to flag nodes (having a link to the hover node) that have all links with error states. If mouse or pointer is moved away from the hover node with no action (click or selection), the display screen return to the base display mode, such as that shown in FIG. 2. Showing a highlight or ring around a node reduces the visual clutter that would otherwise occur if the links themselves are shown. In FIG. 4 (and subsequent figures), nodes with a highlight are shown with a bolded circle around them, as compared to other circles that have a lighter circle around them.

Figure 5:
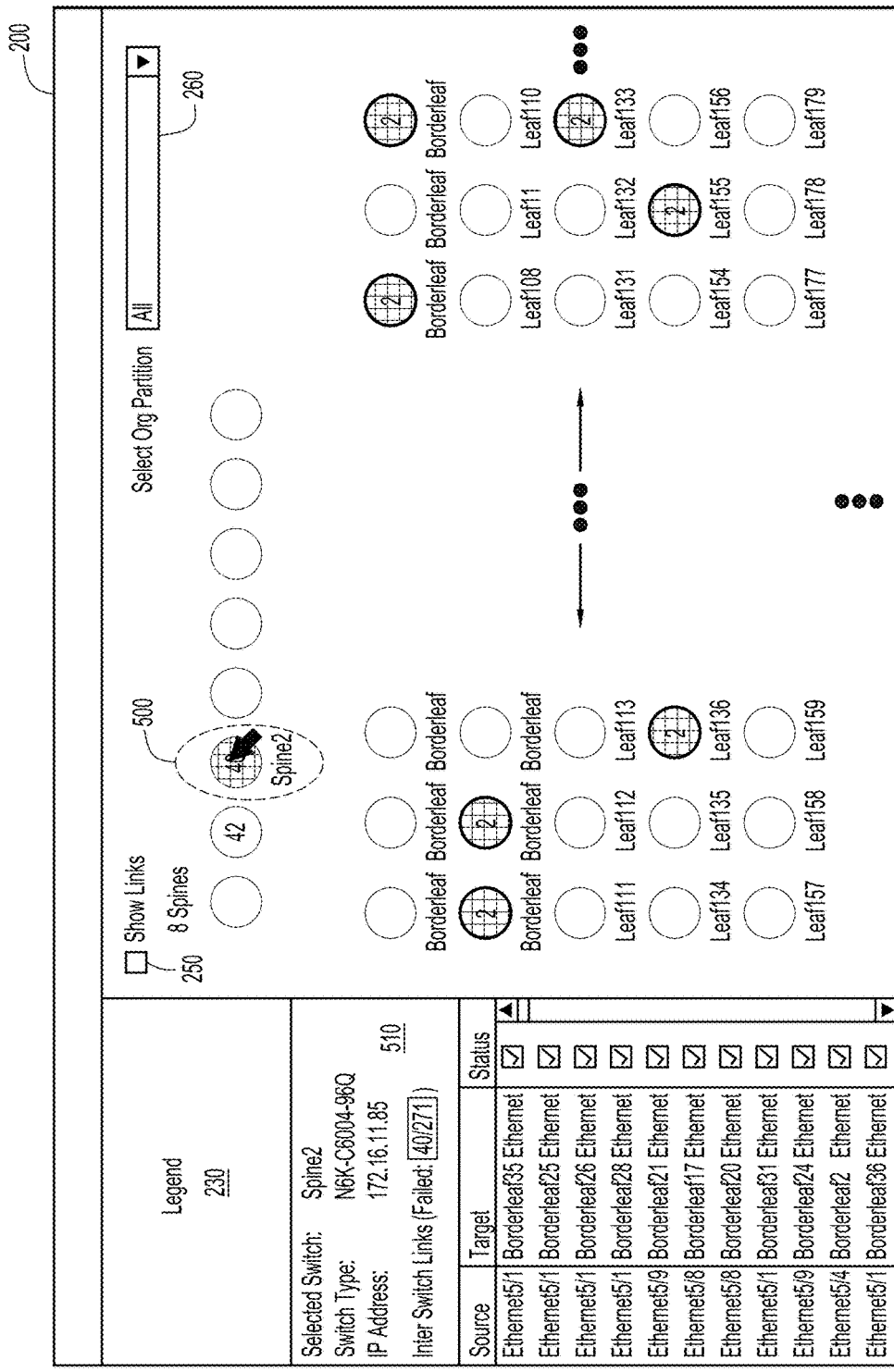
FIG. 5 illustrates an example of the display screen when the first node is selected, according to an example embodiment.

Reference is now made to FIG. 5. By clicking on a node, the node becomes selected. In FIG. 5, node Spine2 is selected as shown at 500. When a node is selected, all nodes that are not connected to the selected node are displayed in less conspicuous manner (e.g., "greyed-out") to indicate that those graphical elements are functionally disabled for purposes of any further display functions while in that state (unresponsive to a mouse hover or click). The rings or highlights of connected nodes may be "locked" so that they remain, even on mouse-out (movement of the mouse away from the selected node). Summary information 510 about the selected node is displayed in side summary panel 240 on the left. For example, the summary information 510 includes the name of the selected switch (Spine2), switch type (N6K-C6004-96Q, e.g., a Nexus™ 6000 switch manufactured by Cisco Systems, Inc.) and IP address (172.16.11.85). In addition, the summary information 510 indicates a summary of the inter-link status of the selected switch, where "41/271" means that 41 out of 271 inter-node links have an error state. Finally, at the bottom of summary panel 240 is a list of each of the inter-node links for the selected node, including information for Source, Target and Status for each link. Again, a green-colored icon with a check mark may be used to indicate that the link is operating normally, as explained above in connection with FIG. 3.

Figure 6:
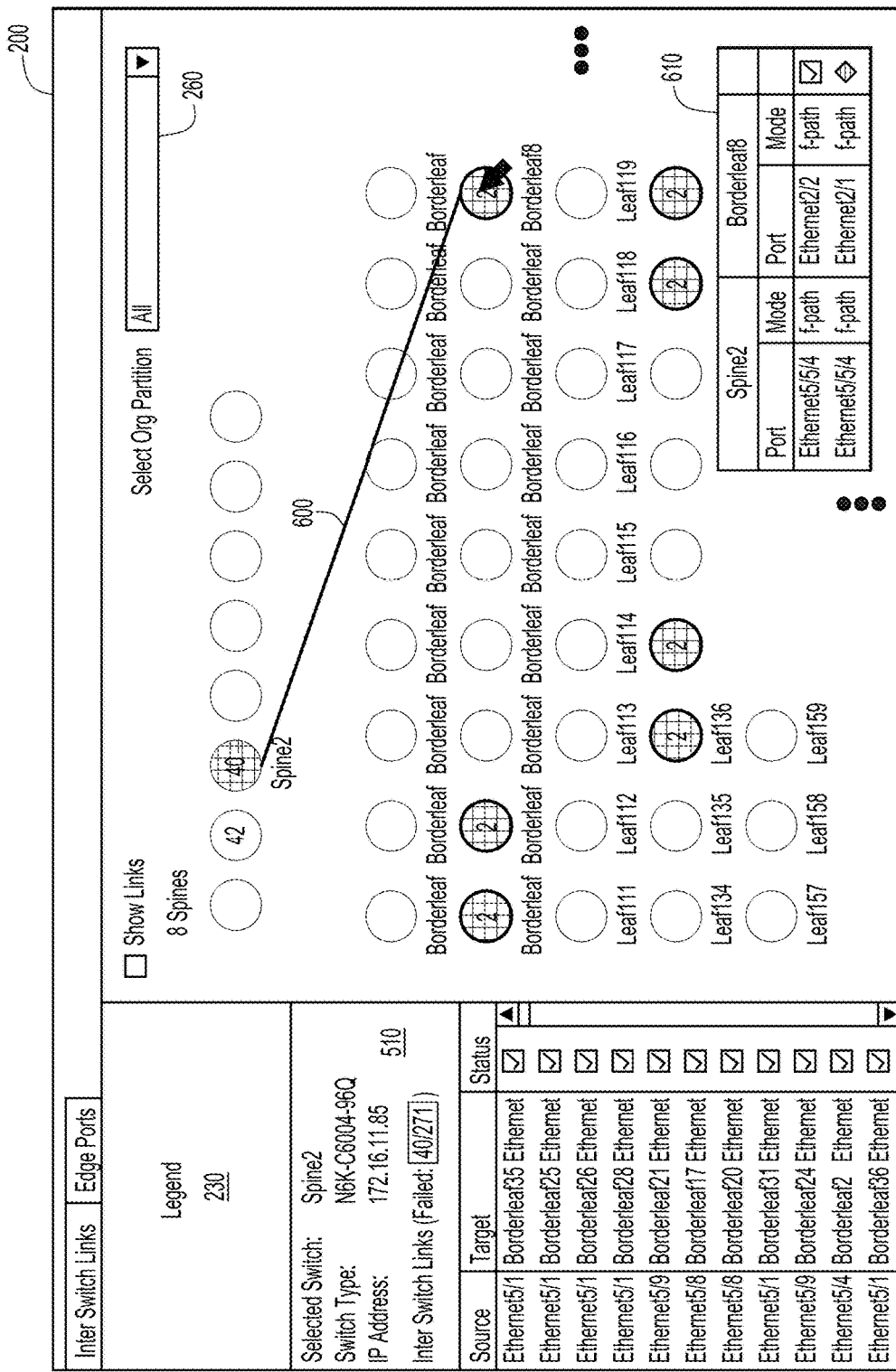
FIG. 6 illustrates an example of the display screen when a hover over a second node occurs while the first node is selected, according to an example embodiment.

Reference is now made to FIG. 6. Following the example of FIG. 5, after a node is selected, the user can then hover over any connected nodes for additional information. FIG. 6 shows that a user has hovered over node BorderLeaf8. A link line 600 is shown between the selected node (Spine2) and the hover node (BorderLeaf8). In addition, a detail pop-up window 610 is displayed. The pop-up window 610 is populated with information to describe the link or links between the two nodes (showing individual error conditions). The pop-up window 610 is displayed so as not to cover or overlay the selected node and the hover node. The pop-up window 610 shows a listing of the links between the selected node and the hovered-over node. In one example, the pop-up window 610 includes information indicating the ports used on each node for the link and the status, as well as the "mode" (which determines which feature to enable). The status is the aggregate link status as determined by the port status on each side/end of the link, with a secondary indicator of whether the link is consistently configured. In the example of FIG. 6, "fpath" indicates a Cisco FabricPath mode.

Figure 7:
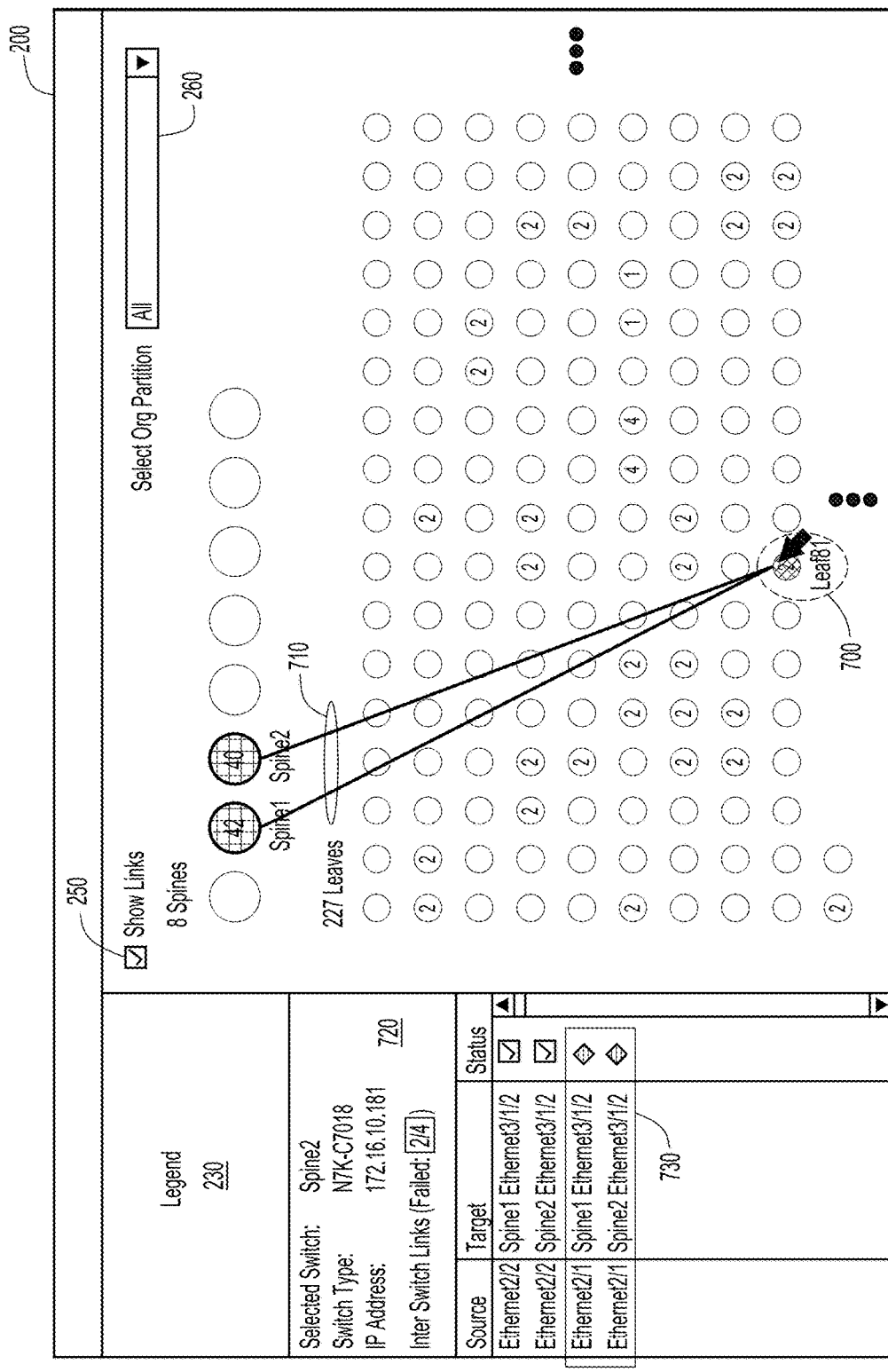
FIG. 7 illustrates an example of the display screen when a particular node is selected and user input is received to display links between the particular node and nodes connected to the particular node, according to an example embodiment.

Turning now to FIG. 7, a screenshot is shown of another form of display 200. In this example, a single node selection is made, e.g., of node Leaf81. This node, as indicated by the "2" in its circle, has two links that are in an error state. As a result, when this node is selected, as shown at 700, the two nodes associated with the error state links are highlighted, e.g., nodes Spine1 and Spine2. In addition, by selecting the "show links" box 250, the two links between the selected node, Leaf81, and Spine1 and Spine2 are displayed, as shown at reference numeral 710. In addition, in the summary panel 240, information is displayed for selected node, Leaf81. This information indicates, in this example, that there are four inter-node links for this node, and ¾ of those nodes are in a error/failure state. The source, target and status information for each of the four inters-node links is listed in tabular form in summary panel 240. Thus, FIG. 7 illustrates that for single node selection or with certain filtering criteria, a useful display may be generated under certain conditions (for example selection of leaf vs. spine). This is also useful for smaller networks.

Figure 8:
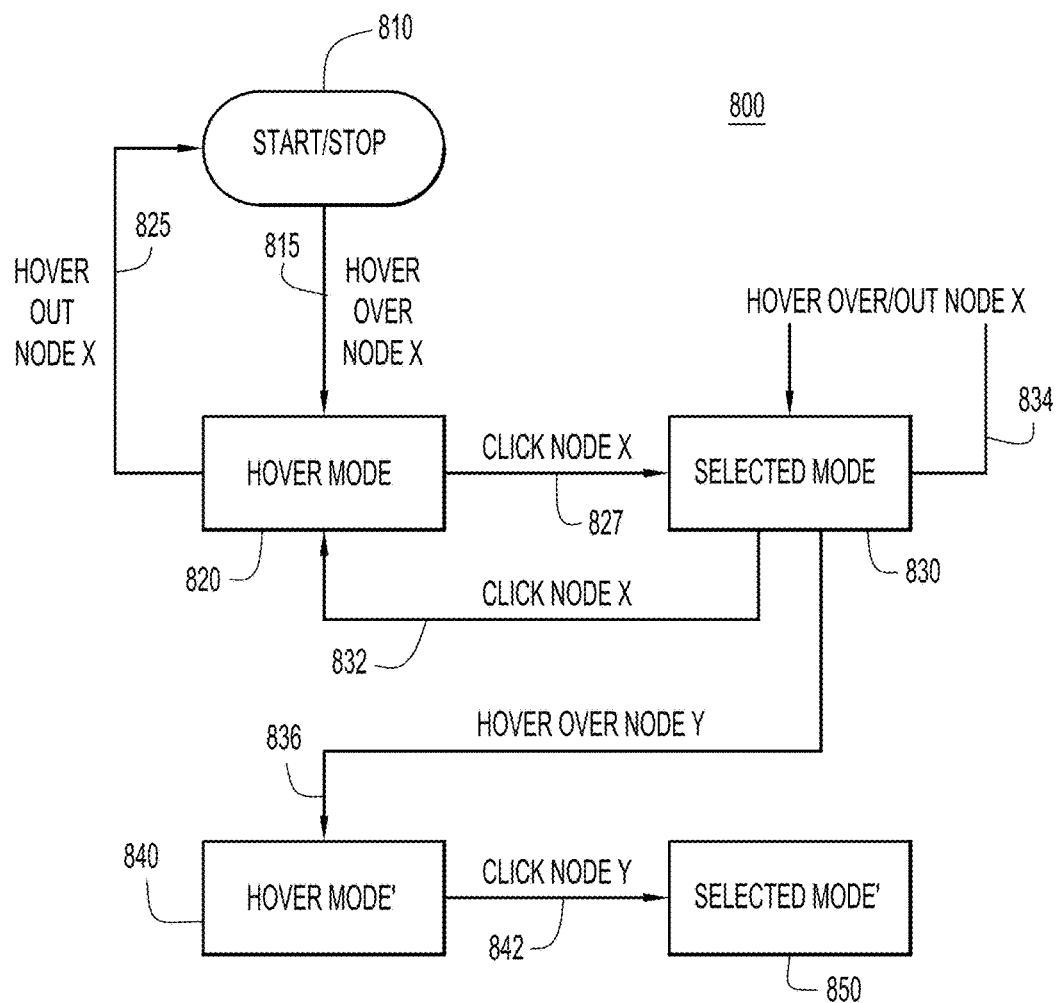
FIG. 8 is an example of a flow chart depicting operations performed in response to receiving node hover and node select user input, according to an example embodiment.

Reference is now made to FIG. 8. FIG. 8 illustrates an example of a flow chart 800 that depicts the operations associated with generating the various display modes (hover, selection, etc.). FIGS. 2-7 are also referred to in connection with the description of the flow chart 800. The start/stop state is shown at 810. When a mouse or other pointer or gestures is detected as a hover over a displayed node (generically denoted as Node X in this figure), then as shown at 815, flow proceeds to Hover Mode 820. Node X may be considered an arbitrary first node. Any connections that Node X has that are in any error state are displayed as a color-coded circle around the node to which Node X is connected. If the show links box 250 is checked/selected, then the links between Node X and its connected nodes for which links are in an error state are displayed. While in the Hover Mode 820, a user can move the mouse off of Node X, and if so, the display state is returned to the base display state or mode as shown at 825. When in Hover Mode 820, a user may click/select Node X as shown at 827. This changes the display mode to Selected Mode 830. In the Selected Mode 830, all nodes not connected to Node X are disabled (turned light-grey and are unresponsive to a mouse hover or click). The highlights or rings of the Hover Mode become "locked" and remain on even if the mouse if moved off of node X. This allows a user to quickly identify problem areas and hover over other relevant nodes. If the user selects/clicks on Node X again, then the display mode reverts to Hover Mode 820 as shown at 832. If the user continues to hover over Node X while in the Selected Mode 830, no display mode transition is made, as shown at 834.

If, while in Selected Mode 830 (for Node X), the user hovers over a second node, Node Y that is connected to Node X, then the display mode transitions, as shown at 836, to Hover Mode' 840. In Hover Mode' 840, if Node Y has a ring/highlight displayed, the ring/highlight remains displayed on Node Y and a color-coded line is drawn between Node Y and Node X, where the color coded line represents the state of the link between Node X and Node Y. In addition, a pop-up window is displayed (e.g., display window 610 in FIG. 6) with additional information about that link. While in Hover Mode' 840, if the user clicks/selects Node Y, as shown at 842, then the Selection Mode shifts from Node X to Node Y, as shown at 850. Clicking/selecting Node Y again exits the Selection Mode.

Figure 9:
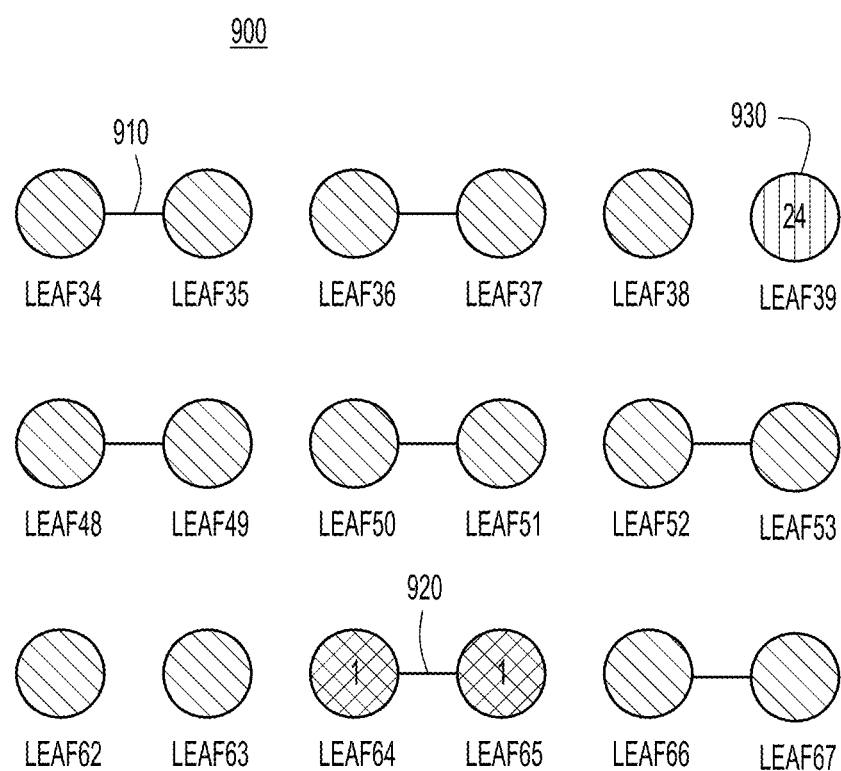
FIG. 9 is an example of a display scheme to depict the state of links between nodes within the same tier, according to an example embodiment.

Reference is now made to FIG. 9. FIG. 9 shows an example of other data that can be displayed using the visualization themes presented herein. In this host facing view, nodes in only a leaf tier 900 is shown. The hosts connected to nodes in leaf tier 900 are also not shown in the visualization, but contribute to the number of links down for each node. Moreover, FIG. 9 shows a visual paradigm for edge ports and state of a link between leaf nodes that implement channel pairing technology, such as Cisco's Virtual PortChannel™ technology. For example, at reference numeral 910, a link is shown between nodes Leaf34 and Leaf35. This link is operating with no error issues, and therefore is color-coded green (but shown with a corresponding cross-hatching pattern). Conversely, nodes Leaf64 and Leaf65 each are yellow with the number "1" in each circle, indicating that each node has one link in an error state. In addition, the link 920 between Leaf64 and Leaf65 is color-coded yellow indicating that it is in an error state. FIG. 9 also shows, at reference numeral 930, that node Leaf39 has all of 24 of its links (to hosts) down.

Figure 10:
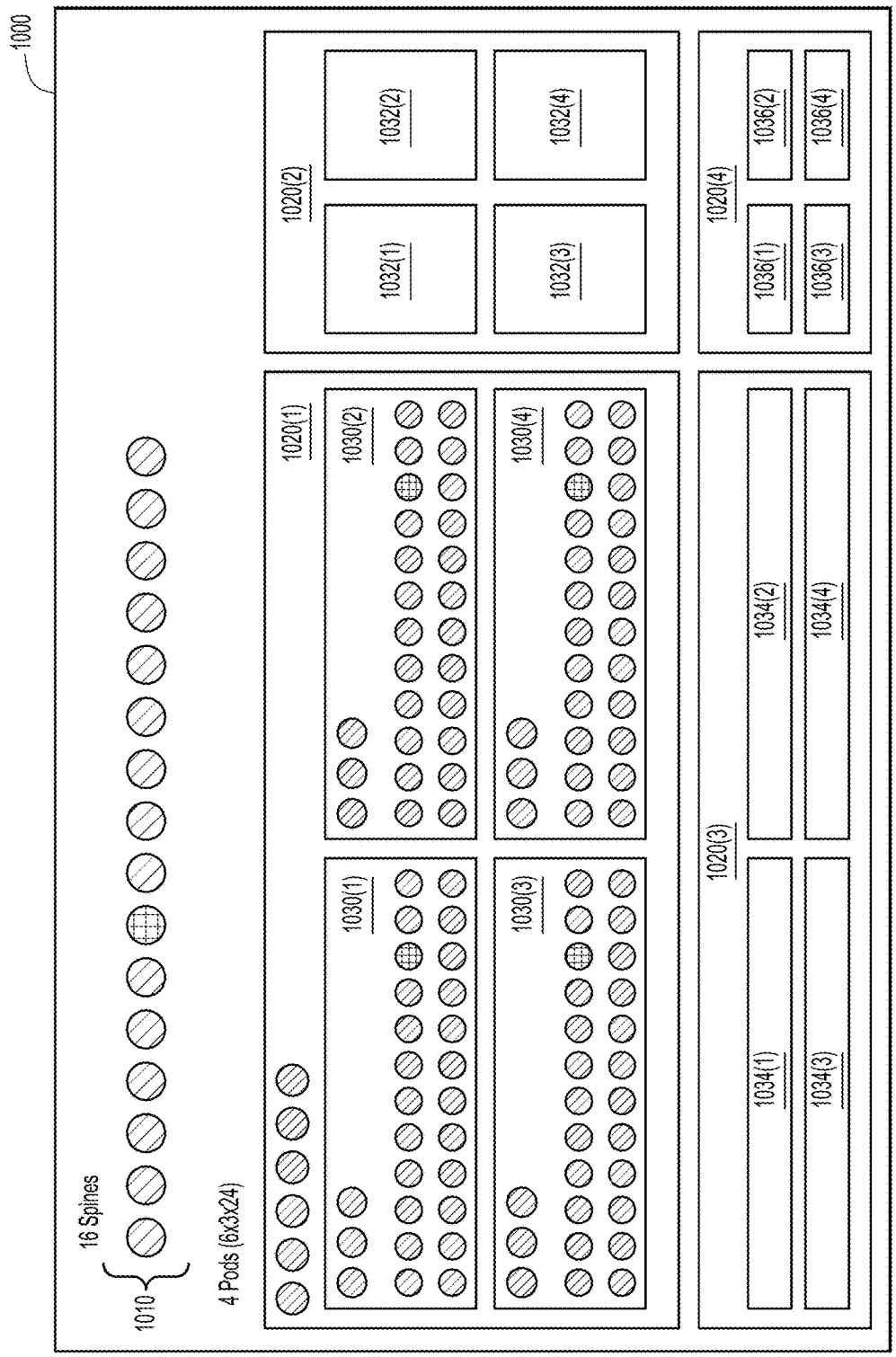
FIGS. 10 and 11 are examples of application of the display techniques depicted in FIGS. 2-9, to more complex multi-tier networks.
Figure 11:
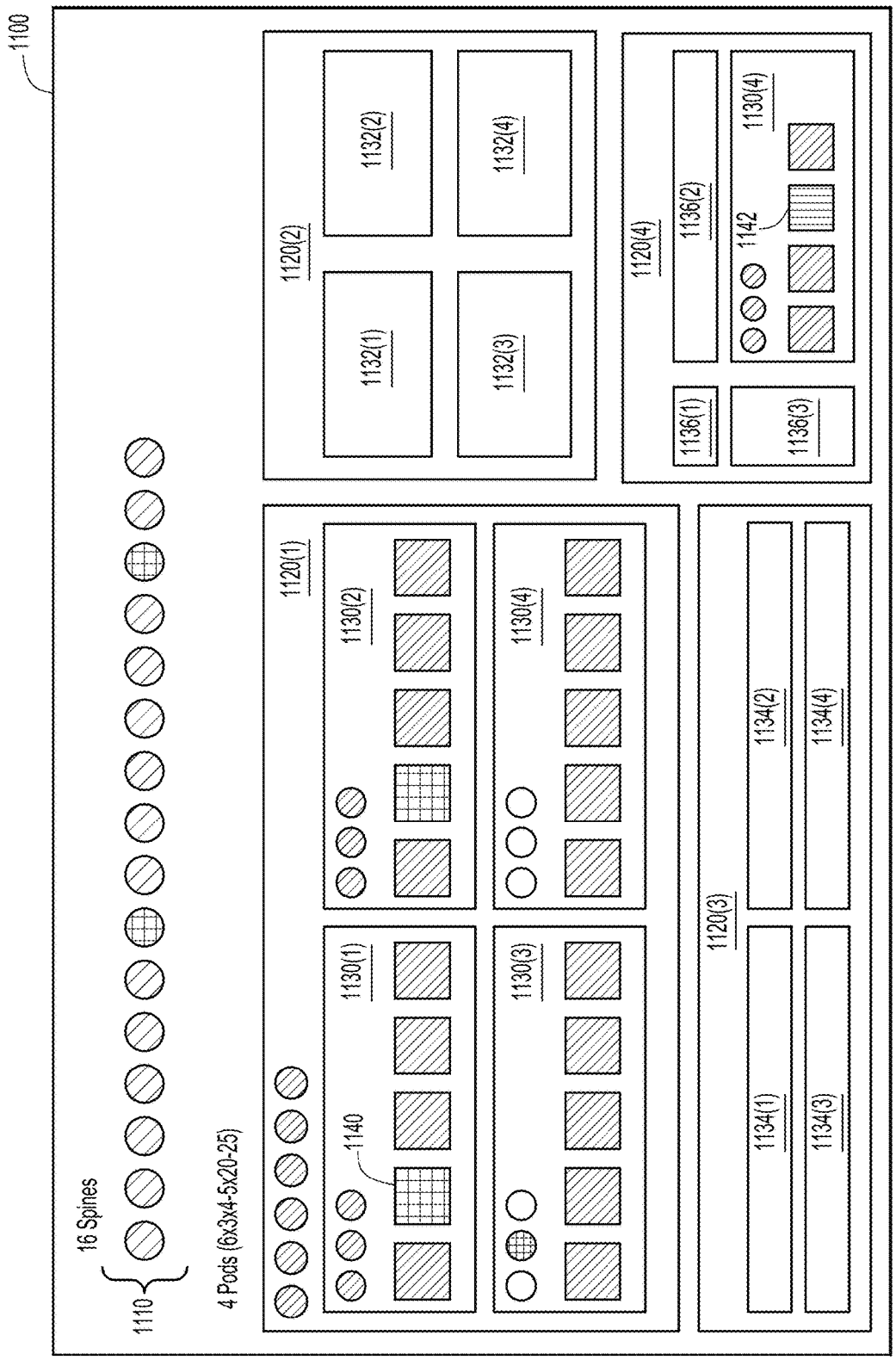

Reference is now made to FIGS. 10 and 11, which show examples of multi-tier networks with more than two tiers. Sectional multi-tier network topologies are useful because, among other things, they reduce the total number of cables required to build the network. As an example: a 16×384 node network would require 6144 cables. The cables as well as transceivers can be expensive. Therefore, in order to determine an optimum balance to reduce total cost, a network designer may split the network.

Using a 4-way partition and introducing an additional 16 switches to make up the intermediate layer, one may create a 16×16 in the top tier, or 256 links. Below this in each nested complete bipartite graph there are 4×96 links or 384. This means a total of 1792, or around 70% fewer cables.

Adding tiers also increases the number of nodes, e.g., switches, needed, decreases capacity between adjacent nodes, and increases overall packet latency and network convergence times. Notwithstanding the justification or tradeoffs for the determination of a number of tiers, topological sub-graphs of each would need to be displayed with the same overall simplicity of a two-tier graph as shown in FIG. 2.

In the multi-tier case, squares are drawn around sets of two parent/child partitions, called pods. For example, as shown in FIG. 10, a network is depicted in display screen 1000 comprising 16 spine nodes, shown at reference numeral 1000, and four pods of leaf nodes shown at reference numerals 1020(1), 1020(2), 1020(3) and 1020(4). Each pod includes a 6×3×24 node architecture, where the top tier of each pod consists of 6 nodes, and there are 4 sub-pods, each consisting of 3 higher tier nodes and 24 lower tier nodes. For example, pod 1020(1) includes sub-pods 1030 (1), 1030(2), 1030(3) and 1030(4), and each of these 4 sub-pods has a 3×24 node architecture. Likewise, pod 1020 (2) includes sub-pods 1032(1), 1032(2), 1032(3) and 1032 (4), pod 1020(3) includes sub-pods 1034(1), 1034(2), 1034 (3) and 1034(4), and pod 1020(4) includes sub-pods 1036 (1), 1036(2), 1036(3) and 1036(4). The display techniques depicted in FIGS. 2-9 may be applied to the display scheme of FIG. 10.

As the scale increases, pods can be collapsed to show a representative state for the entire pod. For example, FIG. 11 shows a display screen 1100 for an example where there is, like in FIG. 10, tier 1100 of spine nodes, but each pod 1120(1), 1120(2), 1120(3) and 1120(4) includes a 6×3×4-5× 20-25 node architecture. That is, within each pod 1120(1), 1120(2), 1120(3) and 1120(4) are sub-pods that in turn include a 3×4-5×20-25 sub-pods. For example, pod 1120(1) includes sub-pods 1130(1), 1130(2), 1130(3) and 1130(4), and each of these 4 sub-pods has a 3×4-5×20-25 node architecture. Likewise, pod 1010(2) includes sub-pods 1132 (1), 1132(2), 1132(3) and 1132(4), pod 1120(3) includes sub-pods 1134(1), 1134(2), 1134(3) and 1134(4), and pod 1120(4) includes sub-pods 1136(1), 1136(2), 1136(3) and 1136(4). Thus, each rectangle within a sub-pod represents a pod in and of itself, and the color/pattern displayed for that sub-pod indicates the representative state for the entire pod.

For example, pod 1140 within sub-pod 1130(1) of pod 1120(1) may be displayed yellow with a number in it to indicate the number of inter-node links that are in an error state. Similarly, pod 1142 within sub-pod 1136(4) of pod 1120(4) may be displayed red with a number in it to indicate the number of inter-node links that are in an error state. The display techniques presented above in connection with FIGS. 2-9 may be used in connection with the example of FIG. 11.

Reference is now made to FIG. 12. FIG. 12 illustrates a flow chart that depicts operations of a computer-implemented process 1200 for the display techniques described in the foregoing example embodiments. At 1210, data is received that represents connectivity state between a plurality of nodes interconnected in a hierarchical manner in a network and including at least a first tier of nodes and a second tier of nodes. The nodes in the second tier have at least one link to each node in the first tier. At 1220, display data is generated based on the connectivity state among the plurality of nodes. The display data describing a graphical user representation of the inter-tier link status of individual nodes or groupings of nodes. At 1230, the display data is presented to a display device. The display device may be local to or remote from the device that performs one or both of the receiving and generating operations of steps 1210 and 1220.

As explained above, generating the display data may comprise generating a graphical element for each individual node and setting a color or pattern of the graphical element to one of a plurality of color or patterns to indicate the inter-tier link status associated with the network node. In addition, a number may be generated for display in association with a graphical element, where the number indicates how many inter-tier links associated with a node are in an error state.

Setting the color or pattern of the graphical element for a node may comprise setting a first color or pattern for a graphical element to indicate that all inter-tier links associated with the node are operating normally, setting a second color or pattern to indicate that some inter-tier links associated with the node are in an error state, and setting a third color or pattern to indicate that all inter-tier links associated with the node are in an error state. Furthermore, setting the color or pattern may include setting a fourth color or pattern for a graphical element to indicate that the corresponding node is unreachable, and setting a fifth color or pattern for a graphical element to indicate that only one remaining inter-tier link associated with the node is operating normally.

The display data may be generated such that a base display state or mode is provided in which edges (links) between nodes are by default hidden unless user input is received to display data representing status of links.

Step 1220 may involve receiving user input to change the displayed data. The user input may indicate a hover over a graphical element for an arbitrary first node, and in response to detecting the hover for the first node, display data is generated to display a color-coded highlight around each node that has a link to the first node is in any type of error state. In addition, step 1220 may involve receiving user input indicating a selection of a graphical element for the first node, and in response to detecting the selection of the particular node, display data is generated to display all nodes not connected to the first node in a disabled or greyed-out state. Further, in response to detecting selection of the first node a locked state is generated for the color-coded highlight around each node that has a link to the first node so that the highlight remains if the graphical element for the first node is no longer selected, and information is displayed pertaining to the links between the first node and each of the nodes having a link to the first node.

Step 1220 may further involve receiving user input indicating a hover over a graphical element for a second node having a link to the first node, and in response generating the display data comprises displaying a link line between the first node and the second node, and displaying in a window not overlapping the graphical element for the second node information describing any error conditions or other state information of the link or links between the first node and the second node.

Figure 13:
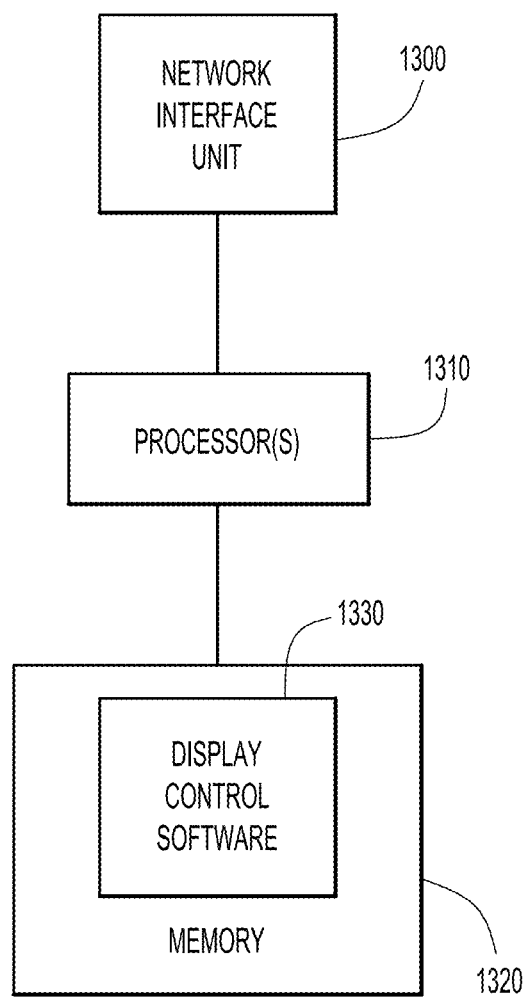
FIG. 13 is a block diagram of a computing apparatus configured to perform one or more operations of the display techniques according to an example embodiment.

FIG. 13 illustrates an example block diagram of a computing apparatus, e.g., the server 50 on which the data center network manager 60 runs, as depicted in FIG. 1. The server 50 includes a network interface unit 1300 to enable communications of a network, e.g., to receive or obtain data representing connectivity state between a plurality of nodes interconnected in a hierarchical manner in a network, and to send display data to a remote device in accordance with the display techniques presented herein. The server 50 includes one or more processors 1320 to perform the various computing operations associated with the display techniques. A memory 1330 is provided that is used to store connectivity state data for the plurality of nodes and related data generated in the course of performing the display techniques. The memory 1330 may comprise read only memory (ROM), random access memory (RAM), magnetic disk storage media devices, optical storage media devices, flash memory devices, electrical, optical, or other physical/tangible memory storage devices.

To this end, the memory 1330 includes display control software 1340 that includes processor executable instructions that, when executed by a processor, e.g., processor 1320, cause the processor to perform the operations described herein. Thus, in general, the memory 1330 may comprise one or more tangible (non-transitory) computer readable storage media (e.g., a memory device) encoded with software comprising computer executable instructions and when the software is executed (by the processor 1320) it is operable to perform the operations described herein.

The network visualization techniques presented herein provide a sense of problem areas and the scale of any problems at a glance, even for a very large scale network. The visual presentation includes a mixture of simplification, interaction-based information-on-demand and use of small multiples to quickly convey individual deviations. These techniques allow a user to instantly recognize the connection state of a large fabric. It also allows the user to individually and selectively drill-down into problem areas.

In summary, a computer-implemented method is provided comprising receiving data representing connectivity state between a plurality of nodes interconnected in a hierarchical manner in a network and including a first tier of nodes and a second tier of nodes, wherein the nodes in the second tier have at least one link to each node in the first tier; generating display data based on the connectivity state among the plurality of nodes, the display data describing a graphical user representation of the inter-tier link status of individual nodes or groupings of nodes; and presenting the display data to a display device.

Similarly, an apparatus is provided comprising a network interface unit configured to receive data representing connectivity state between a plurality of nodes interconnected in a hierarchical manner in a network and including a first tier of nodes and a second tier of nodes, wherein the nodes in the second tier have at least one link to each node in the first tier;

at least one processor coupled to the network interface unit, wherein the processor is configured to: generate display data based on the connectivity state among the plurality of nodes, the display data describing a graphical user representation of the inter-tier link status of individual nodes or groupings of nodes; and present the display data to a display device.

Further still, one or more tangible computer readable storage media are provided storing instructions that, when executed by a processor, cause the processor to: obtain data representing connectivity state between a plurality of nodes interconnected in a hierarchical manner in a network and including a first tier of nodes and a second tier of nodes, wherein the nodes in the second tier have at least one link to each node in the first tier; generate display data based on the connectivity state among the plurality of nodes, the display data describing a graphical user representation of the inter-tier link status of individual nodes or groupings of nodes; and present the display data to a display device.

The above description is intended by way of example only. Various modifications and structural changes may be made therein without departing from the scope of the concepts described herein and within the scope and range of equivalents of the claims.

What is claimed is:

1. A computer-implemented method comprising:
receiving data representing a connectivity state between a plurality of nodes interconnected in a hierarchical manner in a network and including a first tier of nodes and a second tier of nodes, wherein the nodes in the second tier have at least one link to each node in the first tier;
generating display data based on the connectivity state among the plurality of nodes, the display data describing a graphical user representation of an inter-tier link status of individual nodes or groupings of nodes of the plurality of nodes, the display data comprising a graphical element for each individual node of the plurality of nodes;
presenting the display data to a display device;
receiving user input indicating a hover over the graphical element for a first node of the plurality of nodes; and
in response to detecting the hover for the first node, generating further display data to display a color-coded highlight around each node of the plurality of nodes that has a link to the first node and is in any type of error state, wherein
the network is configured, maintained, or troubleshot based on the display data and/or the further display data.

2. The method of claim 1, wherein generating the display data comprises configuring the graphical elements for the individual nodes to be arranged in rows in a display area in at least two regions, where the graphical elements for the first tier of nodes are placed in a first region of the display area and the graphical elements for the second tier of nodes are placed in a second region of the display area, and setting a color or pattern of the graphical element for the first node to one of a plurality of colors or patterns to indicate the inter-tier link status associated with the first node.

3. The method of claim 2, wherein setting the color or pattern of the graphical element for the first node comprises setting a first color or pattern of the graphical element for the first node to indicate that all inter-tier links associated with the first node are operating normally, setting a second color or pattern to indicate that some inter-tier links associated with the first node are in an error state, and setting a third color or pattern to indicate that all inter-tier links associated with the first node are in an error state.

4. The method of claim 3, wherein setting further comprises setting a fourth color or pattern for the graphical element for the first node to indicate that the first node is unreachable, and setting a fifth color or pattern for the graphical element for the first node to indicate that only one remaining inter-tier link associated with the first node is operating normally.

5. The method of claim 1, further comprising, based on available display space on a display screen, generating the display data comprises adjusting a size of the graphical elements for the individual nodes and determining whether to display labels associated with the graphical elements for the individual nodes.

6. The method of claim 1, wherein generating the display data comprises automatically changing the display data in response to asynchronous status change notifications associated with the individual nodes of the plurality of nodes.

7. The method of claim 1, further comprising:
receiving further user input indicating a selection of the graphical element for the first node.

8. The method of claim 7, further comprising:
generating additional display data to display nodes that do not have a link to the first node in a less conspicuous manner, and functionally disabled for display purposes, as compared to nodes that have a link to the first node and are in any type of error state.

9. The method of claim 7, further comprising:
receiving additional user input to display all links between the first node and any node that has a link to the first node and is in any type of error state.

10. The method of claim 7, further comprising:
generating a locked state for the color-coded highlight around each node that has a link to the first node so that the highlight remains if the graphical element for the first node is no longer selected, and further comprising generating data to display information pertaining to the links between the first node and each of the nodes having a link to the first node.

11. The method of claim 7, further comprising:
receiving additional user input indicating another hover over a graphical element for a second node having a link to the first node, and
in response, displaying a link line between the first node and the second node, and displaying in a window not overlapping the graphical element for the second node, information describing state information of the link or links between the first node and the second node.

12. The method of claim 1, further comprising:
receiving further user input to display only nodes in the network that handle traffic with a particular tenant; and
generating additional display data to reduce the number of graphical elements displayed such that nodes that do not handle traffic for the particular tenant are either displayed in a less conspicuous manner or not at all.

13. The method of claim 1, further comprising:
receiving further user input that includes a name of a particular virtual machine or physical machine; and
generating additional display data to display only those nodes to which the particular virtual machine or physical machine is connected.

14. The method of claim 1, further comprising:
generating additional display data representing a plurality of sets of parent-child partitions of nodes in the second tier, each set including a tier of parent nodes with respect to a tier of child nodes, and each set displayed in a parent-child relationship with respect to the first tier of nodes.

15. The method of claim 14, wherein generating the additional display data comprises generating a single graphical element that represents an entire set of parent-child partitions.

16. An apparatus comprising:
a network interface unit configured to receive data representing a connectivity state between a plurality of nodes interconnected in a hierarchical manner in a network and including a first tier of nodes and a second tier of nodes, wherein the nodes in the second tier have at least one link to each node in the first tier, wherein the network interface unit is a device;
at least one processor coupled to the network interface unit, wherein the processor is configured to:
generate display data based on the connectivity state among the plurality of nodes, the display data describing a graphical user representation of an inter-tier link status of individual nodes or groupings of nodes of the plurality of nodes, the display data comprising a graphical element for each individual node of the plurality of nodes;
present the display data to a display device;
receive user input indicating a hover over a graphical element for a first node; and
in response to detecting the hover for the first node, generate further display data to display a color-coded highlight around each node that has a link to the first node and is in any type of error state,
wherein the network is configured, maintained, or troubleshot based on the display data and/or the further display data.

17. The apparatus of claim 16, wherein the processor is configured to configure the graphical elements for the individual nodes to be arranged in rows in a display area in at least two regions, where the graphical elements for the first tier of nodes are placed in a first region of the display area and the graphical elements for the second tier of nodes are placed in a second region of the display area, and to set a color or pattern of the graphical element for the first node to one of a plurality of colors or patterns to indicate the inter-tier link status associated with the first node.

18. The apparatus of claim 16, wherein the processor generates the display data by automatically changing the display data in response to asynchronous status change notifications associated with the individual nodes of the plurality of nodes.

19. The apparatus of claim 16, wherein the processor generates the display data by generating the display data for a base display state in which links between individual nodes of the plurality of nodes are by default hidden unless user input is received to display data representing status of links.

20. The apparatus of claim 16, wherein the processor is further configured to:
receive further user input indicating a selection of the graphical element for the first node.

21. One or more tangible non-transitory computer readable storage media storing instructions that, when executed by a processor, cause the processor to:
obtain data representing a connectivity state between a plurality of nodes interconnected in a hierarchical manner in a network and including a first tier of nodes and a second tier of nodes, wherein the nodes in the second tier have at least one link to each node in the first tier;
generate display data based on the connectivity state among the plurality of nodes, the display data describing a graphical user representation of an inter-tier link status of individual nodes or groupings of nodes of the plurality of nodes, the display data comprising a graphical element for each individual node of the plurality of nodes;
present the display data to a display device;
receive user input indicating a hover over a graphical element for a first node; and
in response to detecting the hover for the first node, generate further display data to display a color-coded highlight around each node that has a link to the first node and is in any type of error state,
wherein the network is configured, maintained, or troubleshot based on the display data and/or the further display data.

22. The non-transitory computer readable storage media of claim 21, wherein the instructions that cause the processor to generate display data comprise instructions that cause the processor to configure the graphical elements for the individual nodes to be arranged in rows in a display area in at least two regions, where the graphical elements for the first tier of nodes are placed in a first region of the display area and the graphical elements for the second tier of nodes are placed in a second region of the display area, and to set a color or pattern of the graphical element for the first node to one of a plurality of colors or patterns to indicate the inter-tier link status associated with the first node.

23. The non-transitory computer readable storage media of claim 21, wherein the instructions further cause the processor to generate additional display data representing a plurality of sets of parent-child partitions of nodes in the second tier, each set including a tier of parent nodes with respect to a tier of child nodes, and each set displayed in a parent-child relationship with respect to the first tier of nodes.

24. The non-transitory computer readable storage media of claim 21, wherein the instructions further cause the processor to:
receive further user input indicating a selection of the graphical element for the first node.

* * * * *